US 7,413,439 B2

(12) United States Patent
Tiessen

(10) Patent No.: US 7,413,439 B2
(45) Date of Patent: Aug. 19, 2008

(54) STOMACH MODEL VISUAL DIETING AID AND METHOD OF USE

(76) Inventor: Marsha L. Tiessen, 100 Briar Ridge Dr., Council Bluffs, IA (US) 51503

( * ) Notice: Subject to any disclaimer, the term of this patent is extended or adjusted under 35 U.S.C. 154(b) by 573 days.

(21) Appl. No.: 11/192,661

(22) Filed: Jul. 29, 2005

(65) Prior Publication Data

US 2007/0009868 A1    Jan. 11, 2007

Related U.S. Application Data

(60) Provisional application No. 60/697,631, filed on Jul. 8, 2005.

(51) Int. Cl.
*G09B 19/00* (2006.01)
(52) U.S. Cl. ....................................... 434/127
(58) Field of Classification Search ................ 434/127, 434/262, 267, 272; 446/296, 297
See application file for complete search history.

(56) References Cited

U.S. PATENT DOCUMENTS

| | | | | |
|---|---|---|---|---|
| 5,356,295 A * | 10/1994 | Grosz | ........................... | 434/267 |
| 5,411,437 A * | 5/1995 | Weber et al. | ................. | 434/269 |
| 5,560,653 A * | 10/1996 | Beppu | ......................... | 283/117 |
| 5,683,251 A * | 11/1997 | Logan et al. | ................. | 434/127 |
| 6,296,488 B1 * | 10/2001 | Brenkus et al. | .............. | 434/127 |
| 6,428,320 B1 * | 8/2002 | Archuleta et al. | ............ | 434/127 |
| 6,431,873 B1 * | 8/2002 | Flagg | .......................... | 434/127 |
| 6,471,518 B1 * | 10/2002 | Beattie | ........................ | 434/272 |
| 7,201,579 B1 * | 4/2007 | Boyum | ........................ | 434/127 |

* cited by examiner

*Primary Examiner*—Kurt Fernstrom

(57) ABSTRACT

A stomach model visual dieting aid includes a generally flexible three-dimensional model of the human stomach having at least length and width dimensions approximately equal to the dimensions of an actual average-sized human stomach and a stomach model storage container including an outer cover and a generally liquid-impervious inner liner mounted on the inner wall of the outer cover. The stomach model storage container is operative to receive and releasably retain the three-dimensional model of the human stomach therein with at least one of said three-dimensional model of the human stomach and the stomach model storage container being at least one of foldable, bendable and rollable to substantially decrease the size of the three-dimensional model of the human stomach when mounted within the stomach model storage container to facilitate transport thereof.

12 Claims, 2 Drawing Sheets

STOMACH MODEL VISUAL DIETING AID AND METHOD OF USE

CROSS-REFERENCE TO RELATED PROVISIONAL PATENT

This application claims priority based on a provisional patent, specifically on the Provisional patent application Ser. No. 60/697,631 filed Jul. 8, 2005.

BACKGROUND OF THE INVENTION

1. Technical Field

The present invention is directed to visual dieting aids and, more particularly, to a three-dimensional latex rubber model of a human stomach which is releasably mounted within a foldable fabric purse which is plastic-lined, the stomach model being approximately life-size and usable to provide a visual aid regarding the amount of food which should be ingested by the user of the invention.

2. Description of the Prior Art

One of the biggest problems confronting a dieter is to determine the amount of food he or she may ingest at a given meal without resorting to the weighing of each individual portion. In many of the most popular diets today, great emphasis is placed on what the individual is eating and not specifically on how much the individual is eating, but it should be clear to even the most untutored dieter that the ingestion of large quantities of selected foods will certainly not assist the person in losing the desired amount of weight. It has further been found that while it is easy to generally determine the types of foods one is ingesting in connection with a particular diet, the specific amount of each of the foods which is to be ingested is not as easy to determine. There is therefore a need for an easy-to-use visual determination method by which a dieter can determine the approximate correct amount of food he or she should be ingesting.

The human stomach is a remarkable organ in that it is designed to accept large quantities of food and drink, begin the digestive process, and release discreet amounts of processed ingested foodstuffs into the intestines for further processing thereof. When a person overindulges, however, the stomach can not function with the same amount of efficiency as it ordinarily would due to the overabundance of food stuffs which have been forced in the stomach. It is difficult, however, for most people to visualize how big the human stomach is and how much food or drink will fill the human stomach without it becoming distended. There is therefore a need for a visual dieting aid which will provide a dieter with a visual representation of the approximate size of his or her stomach.

Therefore, an object of the present invention is to provide a stomach model visual dieting aid and method of use of the same.

Another object is to provide a stomach model visual dieting aid which is a three-dimensional latex rubber model of the human stomach which is approximately life-sized and therefore usable to provide a visual aid regarding the comparative quantity of food which should be ingested by the user of the present invention.

Another object of the present invention is to provide a stomach model visual dieting aid which is releasably mounted within a foldable fabric carrying case or purse which is plastic-lined thereby providing an easily carried and generally spill-proof container for carrying the human stomach model.

Another object of the present invention is to provide a method of use of the stomach model visual dieting aid which includes the steps of removing the stomach model from the carrying case, placing the model generally adjacent the food which is to be eaten by the user and comparing the size of the stomach model to the amount of food to be ingested to determine if the quantity of food exceeds the proper amount which should be ingested, the exceeding of which can result in expansion of the stomach, thereby assisting the dieter in choosing appropriate portion sizes.

Finally, an object of the present invention is to provide a stomach model visual dieting aid and method of use which is relatively simple to manufacture and is safe, efficient, and effective in use.

SUMMARY OF THE INVENTION

The present invention provides a stomach model visual dieting aid including a generally flexible three-dimensional model of the human stomach having at least length and width dimensions approximately equal to the dimensions of an actual average-sized human stomach and a stomach model storage container including an outer cover and a generally liquid-impervious inner liner mounted on the inner wall of the outer cover. The stomach model storage container is operative to receive and releasably retain the three-dimensional model of the human stomach therein with at least one of said three-dimensional model of the human stomach and the stomach model storage container being at least one of foldable, bendable and rollable to substantially decrease the size of the three-dimensional model of the human stomach when mounted within the stomach model storage container to facilitate transport thereof.

The present invention also provides a method of using a stomach model visual dieting aid to assist a dieter in controlling portion size of an amount of food which includes the steps of providing a generally flexible three-dimensional model of the human stomach having at least length and width dimensions approximately equal to the dimensions of an actual average-sized human stomach and providing a stomach model storage container including an outer cover and a generally liquid-impervious inner liner mounted on the inner wall of the outer cover with the three-dimensional model of the human stomach being releasably retained therewithin. The three-dimensional model of the human stomach would then be removed from the stomach model storage container and placed generally adjacent an amount of food such that the three-dimensional model of the human stomach and the amount of food are in generally close proximity. The amount of food would then be visually compared to the size of the three-dimensional model of the human stomach and a determination would be made as to the amount of food which is generally no greater than the size of the three-dimensional model of the human stomach based on that visual comparison. Finally, the correctly portioned amount of food would be selected based on the visual comparison and the determining steps thereby enabling a user of the method to quickly and accurately choose correct food portion sizes.

As thus described, the stomach model visual dieting aid of the present invention provides numerous advantages for persons using the present invention in connection with a program of dieting. For example, one of the significant problems encountered in dieting is to determine what constitutes appropriate portion size, and by merely placing the stomach model of the present invention adjacent the food to be ingested, the user of the present invention may quickly and easily ascertain whether the portion of food chosen is acceptable or clearly exceeds the preferred portion size. Furthermore, because the stomach model of the present invention may be quickly and easily folded into its carrying pouch, it is possible to take the stomach model visual dieting aid out to restaurants and other places away from home and obtain the same benefits of portion size control available at home in the remote location. Also, because the method of use of the stomach model visual dieting aid is relatively simple, virtually anyone can use the present invention as a dieting aid, as opposed to the calorie counting and carbohydrate counting methods commonly used by dieters the world over. This makes the present invention far easier and more effective to use than many dieting aids found in the prior art. Finally, the generally 3-dimensional nature of the stomach model visual dieting aid provides a quick and handy reference for the dieter as to the actual volume of the human stomach, and therefore more appropriate choices may be made as to portion size and food variety than is available when dieting aids found in the prior art are used. It is therefore clear that the present invention provides a substantial improvement over those devices and methods found in the prior art.

DESCRIPTION OF THE PREFERRED EMBODIMENT

The stomach purse 10 of the present invention is shown best in FIGS. 1-4 as including a generally flat sheet of fabric material 12 which is lined on the upper surface thereof by a plastic sheet 14. It is preferred that the fabric sheet 12 have a height of approximately 6 to 12 inches, a width of approximately 6 to 12 inches and be generally rectangular in shape, although the exact size, shape and dimensions of the fabric sheet 12 are not critical to the present invention. It is further preferred that plastic sheet 14 have dimensions slightly less than the dimensions of fabric sheet 12 to provide a lining for the upper surface of the fabric sheet 12 as shown best in FIG. 2. Although the exact natures of the construction materials used in connection with fabric sheet 12 and plastic sheet 14 are not critical to the present invention, it is preferred that plastic sheet 14 be constructed of a generally liquid-impervious flexible plastic sheet material and further that fabric sheet 12 be constructed of an aesthetically pleasing flexible fabric which may include various shapes and designs thereon according to the desires of the manufacturer and purchaser of the stomach purse 10 of the present invention.

Figure 1:
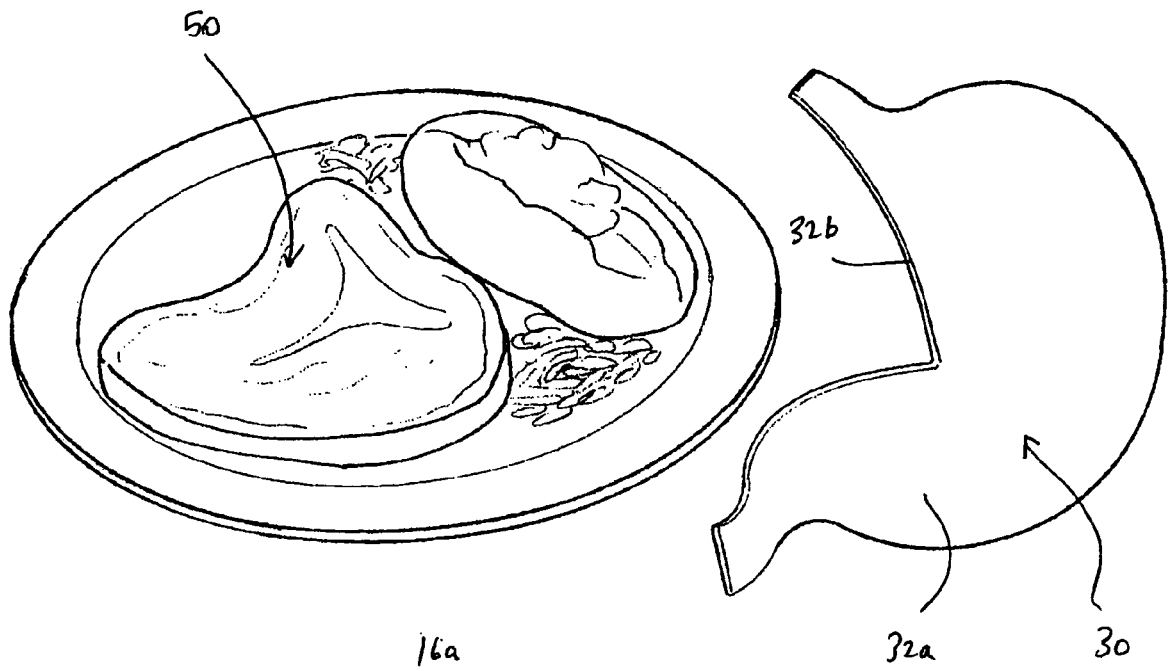
FIG. 1 is a perspective view of the stomach model of the present invention adjacent an amount of food to provide a visual dietary aid.
Figure 2:
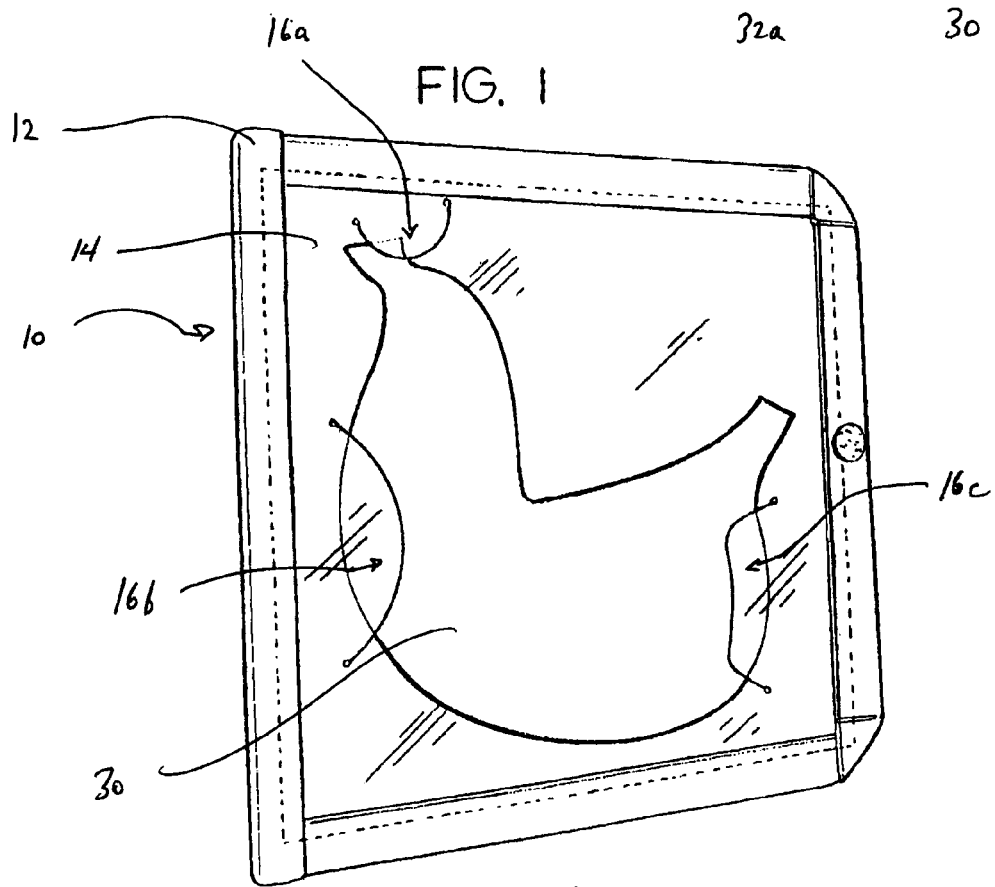
FIG. 2 is a perspective view of the stomach model mounted within the stomach purse.
Figure 3:
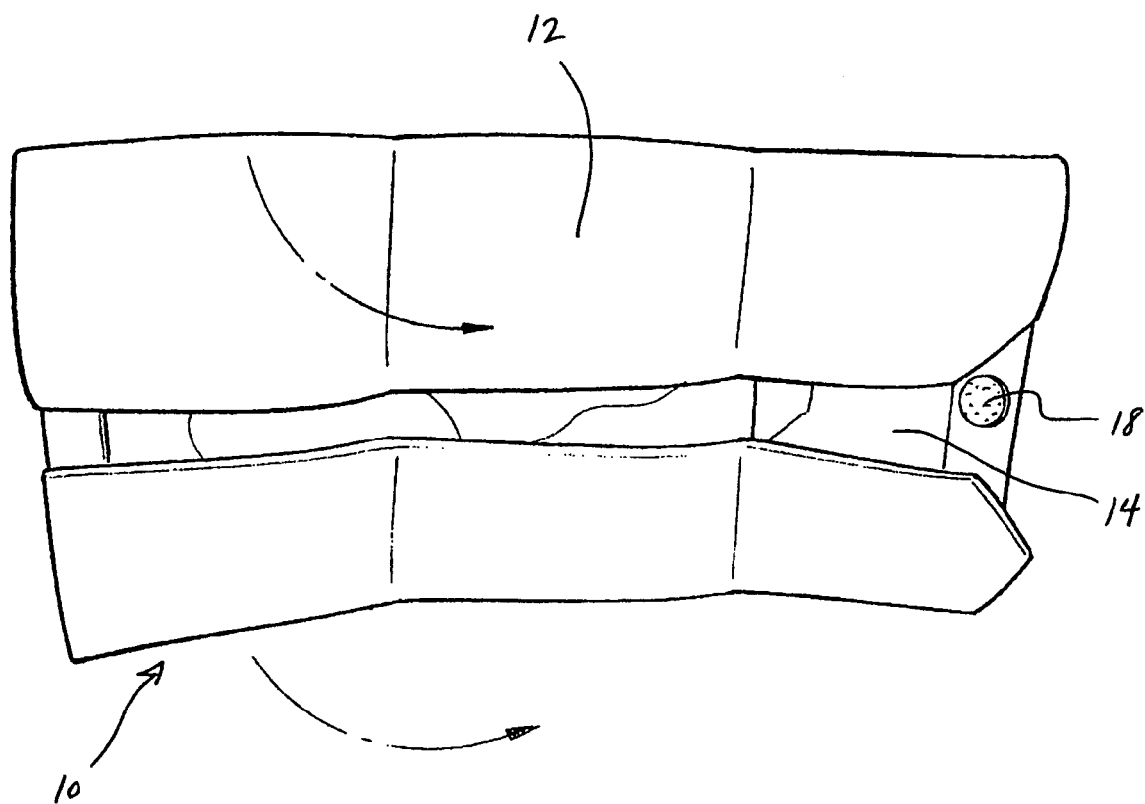
FIG. 3 is a perspective view of the stomach purse of the present invention being folded.

The stomach model 30 of the present invention is shown best in FIGS. 1-3 as including first and second latex sheets 32a and 32b which are connected to one another along the outer edges thereof to form a generally fluid-impervious container which may be inflated to form the three-dimensional model of the human stomach as shown best in FIG. 1. It is an important feature of the present invention that the latex sheets 32a and 32b of stomach model 30 provide a very close approximation of the shape of the human stomach, and not only the shape of the human stomach but also the approximate size and dimensions of the human stomach for a person of average size. Of course, size variations in the human stomach are quite common, and clearly a person who is 5'2" and 100 pounds will have a much smaller stomach than a person who is 6'2" and 270 pounds, but it is expected that the present invention will use the median size and shape of the human stomach as the formational dimensions for the stomach model 30.

When the stomach model 30 is placed within stomach purse 10, it is retained on plastic sheet 14 by a plurality of tabs 16a, 16b and 16c which, in the preferred embodiment, would consist of cutout sections of plastic sheet 14 which may be pivoted out of parallel alignment with the remainder of plastic sheet 14 to slide the edge of stomach model 30 there underneath, as shown best in FIG. 2. Once the edge of stomach model 30 is slid underneath each of the tabs 16a-c, the tabs 16a-c are released and the stomach model 30 is frictionally retained within the tab 16a-c on plastic sheet 14. Of course, numerous other methods of retaining stomach model 30 on plastic sheet 14 may be used with the present invention so long as the securement devices do not materially interfere with the use of the stomach model 30 and the ability of the stomach purse 10 to be folded into a relatively small and easily accessed unit.

Figure 4:
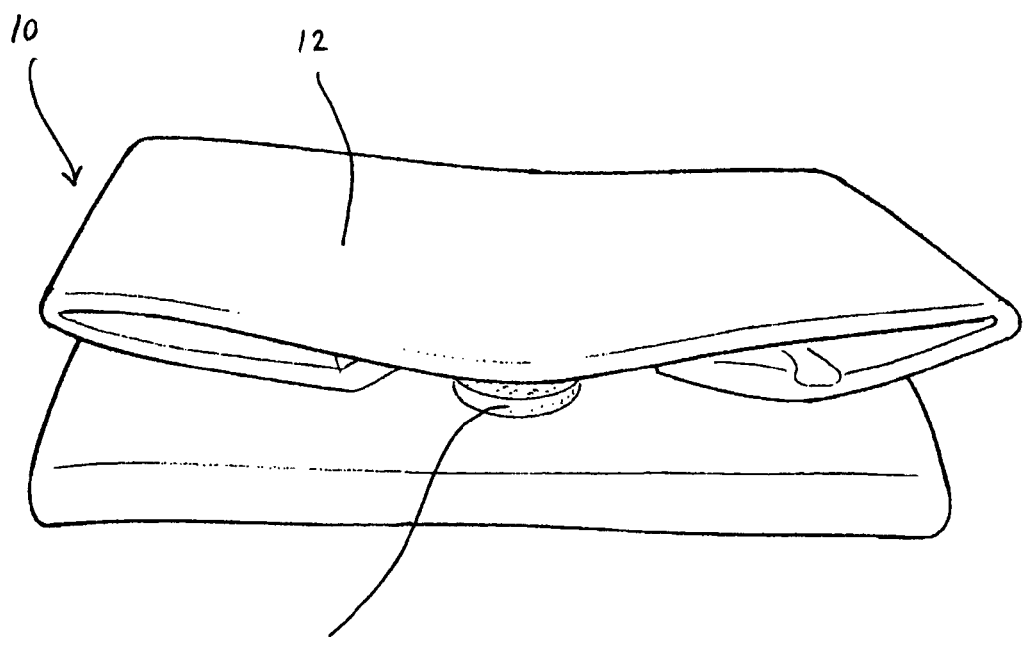
FIG. 4 is a perspective view showing the stomach purse in storage configuration.

Once the stomach model 30 has been placed on plastic sheet 14 underneath tabs 16a-c, the stomach purse 10 may be folded from its open configuration shown in FIG. 2 to its storage configuration shown best in FIG. 4. It is expected that several longitudinal and transverse folds will be made in the fabric sheet 12 and hence plastic sheet 14 to fold the stomach purse 10 into its storage position, as shown in FIG. 3, but it should be understood that the exact location and number of longitudinal and transverse folds is not critical to the present invention so long as the stomach purse 10 may be folded into a relatively compact and easily transportable storage configuration. It is further expected that a hook and loop closure device such as a velcro fastener 18 will be used to secure the stomach purse 10 in its storage configuration, although the exact nature of any such fastening device is not critical to the present invention so long as the stomach purse 10 is retained in its storage configuration.

The stomach purse 10 and stomach model 30 of the present invention would be used as a dietary aid in the following manner. Immediately prior to eating, a user of the stomach purse 10 would remove the stomach purse 10 from his or her carrying location and unfold the stomach purse 10 from its storage configuration to the open configuration of FIG. 2 thus exposing the stomach model 30. The stomach purse 10 may then be laid beside the food 50 to be ingested or, alternatively, the stomach model 30 may be removed from the stomach purse 10 and held adjacent to or over the food 50 which is to be ingested, as shown in FIG. 1. In this manner, the user of the stomach purse 10 of the present invention may instantaneously visualize the actual amount of food he or she is about to ingest as compared to the exact size of his or her stomach, and thus the individual may quickly and easily determine whether the amount of food they are about to ingest is excessive or whether the amount of food they are about to ingest is acceptable. Once the visual determination of the amount of food to be ingested has been made, the stomach model 30 may be returned to the stomach purse 10 and retained therein by the tabs 16a-c and the stomach purse 10 may be refolded to return the stomach purse 10 to its storage configuration.

It should also be noted that it may not be necessary for the individual using the present invention to remove and view the stomach model 30 each time he or she prepares to eat. In fact, once a person has achieved the initial and basic understanding of the approximate size of the stomach model versus the amount of food to be ingested, the stomach purse 10 can be kept in the person's carrying location and briefly viewed as a reminder for the individual. Thus, it may only be occasionally necessary to remove and view the actual model to refresh one's understanding of the size of the stomach versus the amount of food to be ingested, therefore making use of the present invention even easier for the individual using it.

The present invention thus provides a substantial improvement over those dietary aids found in the prior art. For example, because the majority of people cannot visualize the exact size and shape of their stomach, constant overeating is often the result, and the present invention provides an easy to use and socially acceptable means by which an individual can obtain a visual determination of the amount of food he or she is about to ingest. Furthermore, because the stomach purse 10 of the present invention is attractive in appearance and is relatively compact in its storage configuration, it may be easily transported to various locations which permits the stomach purse 10 to be used even when one is in restaurants or the like. Also, because the stomach model 30 is constructed of a liquid-resistant latex material, it will not easily be degraded or destroyed by contact with foodstuffs and/or liquids as would a simple paper model of a stomach, hence the use of latex rubber material. Finally, the inclusion of plastic sheet 14 as an overlay to fabric sheet 12 is designed to permit the quick storage of the stomach model 30 even if the stomach model 30 has been in contact with foodstuffs and/or liquids, and because the plastic sheet 14 is generally impervious to liquids, the fabric sheet 12 is generally protected from contact with residual foodstuffs and/or liquids. It is thus seen that the present invention provides a substantial improvement over those visual aid devices found in the prior art.

It is to be understood that numerous additions, modifications and substitutions may be made to the stomach purse 10 and stomach model 30 of the present invention which fall within the intended broad scope of the above description. For example, the stomach purse 10, although described as being constructed of a fabric material, may be constructed of many different types of flexible materials so long as the aesthetic and functional features of the present invention are maintained. Likewise, the stomach model 30 may be constructed of many different types of materials, but it should be noted that the size and shape of the stomach model 30 are critical to the present invention as it is the generally accurate depiction of the size and shape of the human stomach which renders the present invention a valuable visual aid for a dieter. Finally, it is preferred that the designs used in connection with the fabric material of the stomach purse 10 be aesthetically pleasing, and may include such designs as butterflies and other symbolic representations of change, new life, freedom and beauty to assist the dieter in making smart and appropriate choices in the amount of food which he or she may be eating.

There has therefore been shown and described a stomach purse 10 which accomplishes at least all of its intended objectives.

I claim:

1. A stomach model visual dieting aid comprising:
   a generally flexible three-dimensional model of the human stomach having at least length and width dimensions approximately equal to the dimensions of an actual average-sized human stomach;
   a stomach model storage container including an outer cover and a generally liquid-impervious inner liner mounted on the inner wall of said outer cover; and
   said stomach model storage container operative to receive and releasably retain said three-dimensional model of the human stomach therein with at least one of said three-dimensional model of the human stomach and said stomach model storage container being at least one of foldable, bendable and rollable to substantially decrease the size of said three-dimensional model of the human stomach when mounted within said stomach model storage container to facilitate transport thereof.

2. The stomach model visual dieting aid of claim 1 wherein said stomach model storage container further comprises stomach model retention means mounted within said stomach model storage container on said inner liner for releasably retaining said three-dimensional model of the human stomach within said stomach model storage container.

3. The stomach model visual dieting aid of claim 2 wherein said stomach model retention means comprises a plurality of tabs consisting of cutout sections of said inner liner which may be pivoted out of parallel alignment with the remainder of said inner liner to slide the edge of said three-dimensional model of the human stomach there underneath to releasably secure said three-dimensional model of the human stomach on said inner liner of said stomach model storage container.

4. The stomach model visual dieting aid of claim 1 further comprising at least one longitudinal and at least one transverse fold formed in said stomach model storage container to facilitate folding of said stomach model storage container with said three-dimensional model of the human stomach mounted therein whereby said stomach model storage container may be folded into a relatively compact and easily transportable storage configuration.

5. The stomach model visual dieting aid of claim 1 wherein said generally flexible three-dimensional model of the human stomach is constructed of first and second latex rubber sheets connected to one another along the outer edges thereof to form a generally fluid-impervious container operative to be inflated to form said three-dimensional model of the human stomach, said latex rubber sheets operative to provide a very close approximation of the shape of the human stomach and the approximate size and dimensions of the human stomach for a person of average size.

6. A stomach model visual dieting aid comprising:
   a generally flexible three-dimensional model of the human stomach having length and width dimensions approximately equal to the dimensions of an actual average-sized human stomach;
   a stomach model storage container including an outer cover, an inner liner mounted on the inner wall of said outer cover and stomach model retention means mounted on said stomach model storage container for releasably retaining said three-dimensional model of the human stomach within said stomach model storage container; and
   said stomach model storage container operative to receive and releasably retain said three-dimensional model of the human stomach therein with at least one of said three-dimensional model of the human stomach and said stomach model storage container being at least one of foldable, bendable and rollable to substantially decrease the size of said three-dimensional model of the human stomach when mounted within said stomach model storage container to facilitate transport thereof.

7. The stomach model visual dieting aid of claim 6 wherein said stomach model retention means comprises a plurality of tabs consisting of cutout sections of said inner liner which may be pivoted out of parallel alignment with the remainder of said inner liner to slide the edge of said three-dimensional model of the human stomach there underneath to releasably secure said three-dimensional model of the human stomach on said inner liner of said stomach model storage container.

8. The stomach model visual dieting aid of claim 6 further comprising at least one longitudinal and at least one transverse fold formed in said stomach model storage container to facilitate folding of said stomach model storage container with said three-dimensional model of the human stomach mounted therein whereby said stomach model storage container may be folded into a relatively compact and easily transportable storage configuration.

9. The stomach model visual dieting aid of claim 6 wherein said generally flexible three-dimensional model of the human stomach is constructed of first and second latex rubber sheets connected to one another along the outer edges thereof to form a generally fluid-impervious container operative to be inflated to form said three-dimensional model of the human stomach, said latex rubber sheets operative to provide a very close approximation of the shape of the human stomach and the approximate size and dimensions of the human stomach for a person of average size.

10. A method of using a stomach model visual dieting aid to assist a dieter in controlling portion size of an amount of food comprising the steps:

providing a generally flexible three-dimensional model of the human stomach having at least length and width dimensions approximately equal to the dimensions of an actual average-sized human stomach;

providing a stomach model storage container including an outer cover and a generally liquid-impervious inner liner mounted on the inner wall of said outer cover, said three-dimensional model of the human stomach being releasably retained therewithin;

placing said three-dimensional model of the human stomach generally adjacent an amount of food such that said three-dimensional model of the human stomach and the amount of food are in generally close proximity;

visually comparing the amount of food to the size of said three-dimensional model of the human stomach;

determining the amount of food which is generally no greater than the size of said three-dimensional model of the human stomach based on said visual comparison of the amount of food with the size of said three-dimensional model of the human stomach; and selecting the correctly portioned amount of food based on said visual comparison and said determining steps thereby enabling a user of said method to quickly and accurately choose correct food portion sizes.

11. The method of claim 10 further comprising the step of removing said three-dimensional model of the human stomach from said stomach model storage container prior to placing said three-dimensional model of the human stomach generally adjacent an amount of food.

12. The method of claim 11 further comprising the step of replacing said three-dimensional model of the human stomach within said stomach model storage container after selecting the correctly portioned amount of food based on said visual comparison and said determining steps.

* * * * *

UNITED STATES PATENT AND TRADEMARK OFFICE
CERTIFICATE OF CORRECTION

PATENT NO. : 7,413,439 B2 Page 1 of 1
APPLICATION NO. : 11/192661
DATED : August 19, 2008
INVENTOR(S) : Marsha L. Tiessen It is certified that error appears in the above-identified patent and that said Letters Patent is hereby corrected as shown below:

<u>Title page,</u>
Item 60, Related U.S. Application Data
Line 60, delete "60/697,631, filed on Jul. 8, 2005" and insert --60/592,348, filed on July 29, 2004-- therefor.

<u>Column 1,</u>
Line 9, delete "60/697,631 filed Jul. 8, 2005." and insert --60/592,348 filed on July 29, 2004-- therefor.

Signed and Sealed this

Thirtieth Day of June, 2009

JOHN DOLL
*Acting Director of the United States Patent and Trademark Office*